Figure 1:
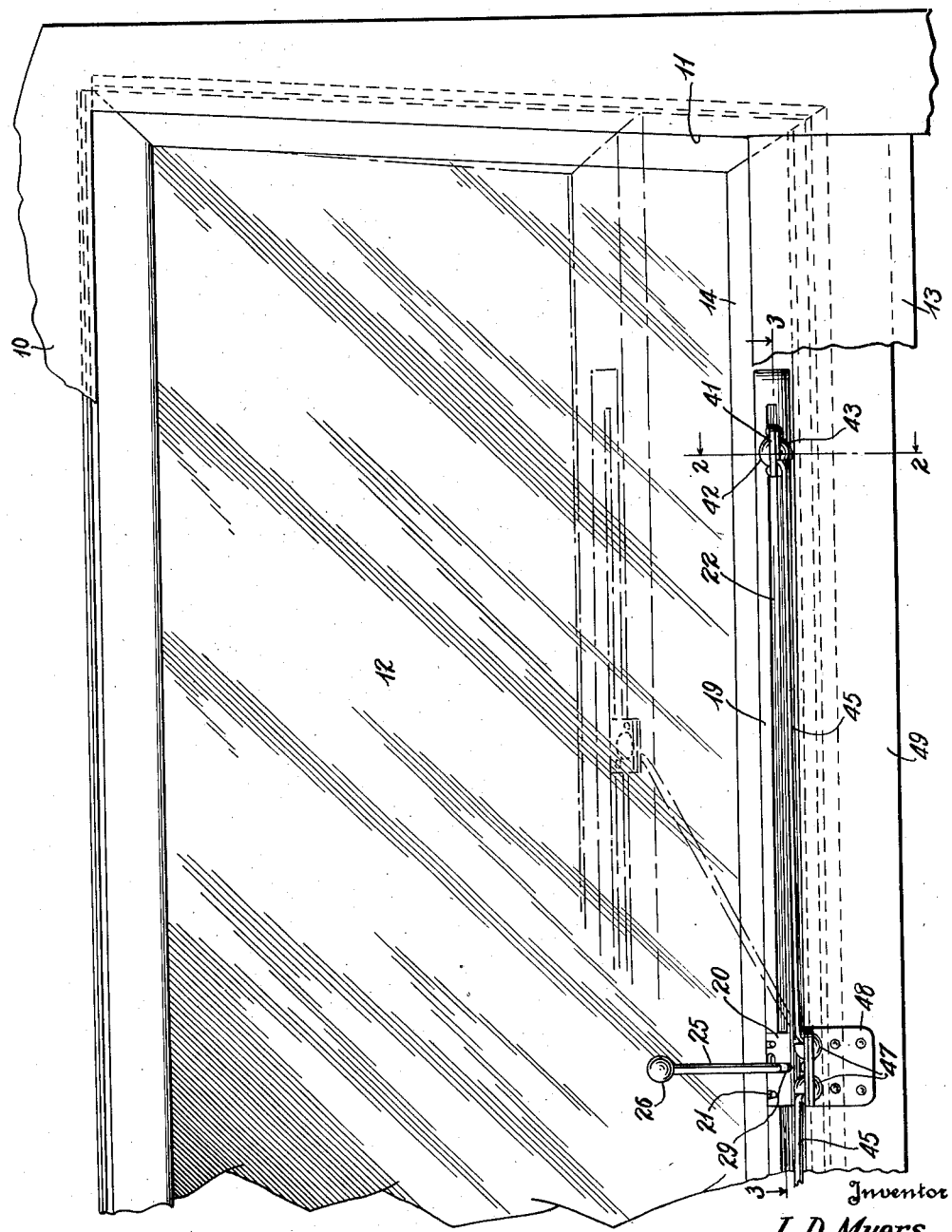

Sept. 25, 1934.  L. D. MYERS  1,974,783
AUTOMOBILE WINDSHIELD CONTROL
Filed Jan. 8, 1932   3 Sheets-Sheet 1

Inventor
L. D. Myers
By Bacon & Thomas
Attorneys

Sept. 25, 1934.  L. D. MYERS  1,974,783
AUTOMOBILE WINDSHIELD CONTROL
Filed Jan. 8, 1932  3 Sheets-Sheet 2
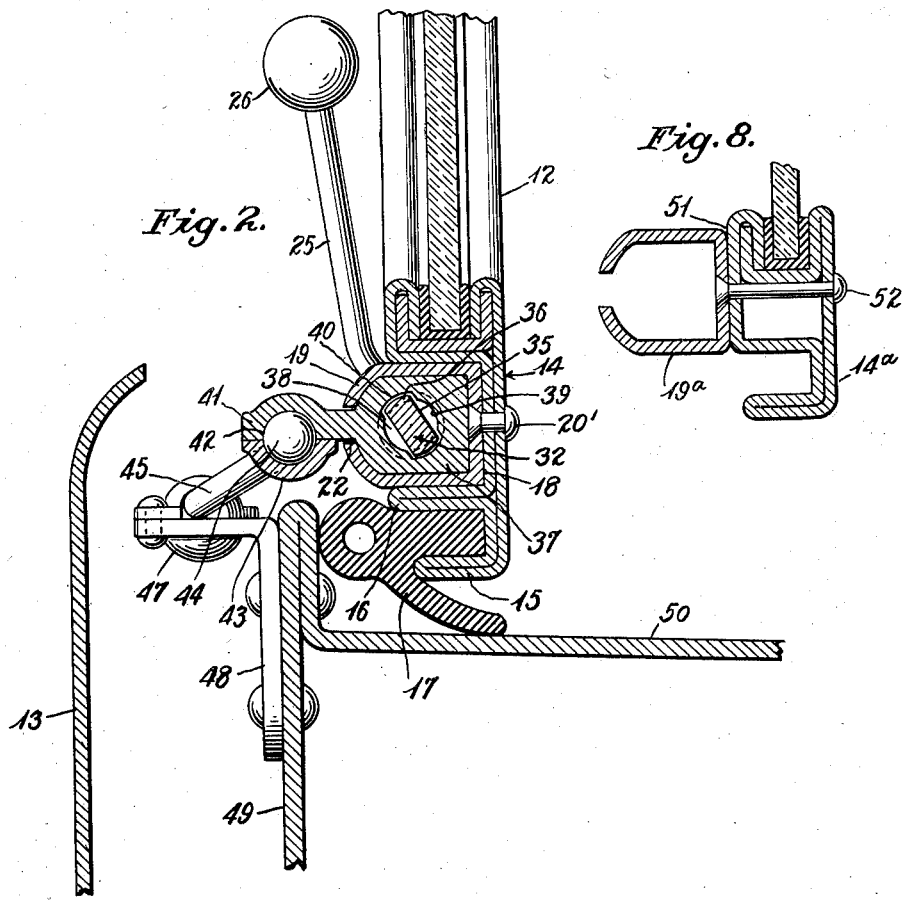
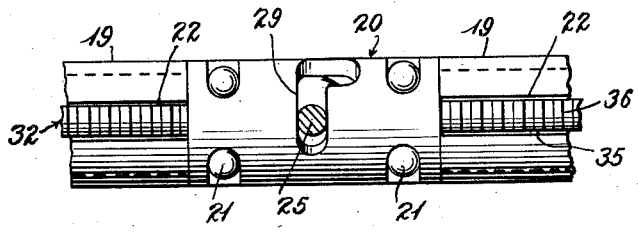
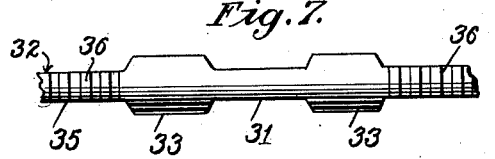
Inventor
L. D. Myers
By Bacon & Thomas
Attorneys Sept. 25, 1934.  L. D. MYERS  1,974,783
AUTOMOBILE WINDSHIELD CONTROL
Filed Jan. 8, 1932    3 Sheets-Sheet 3
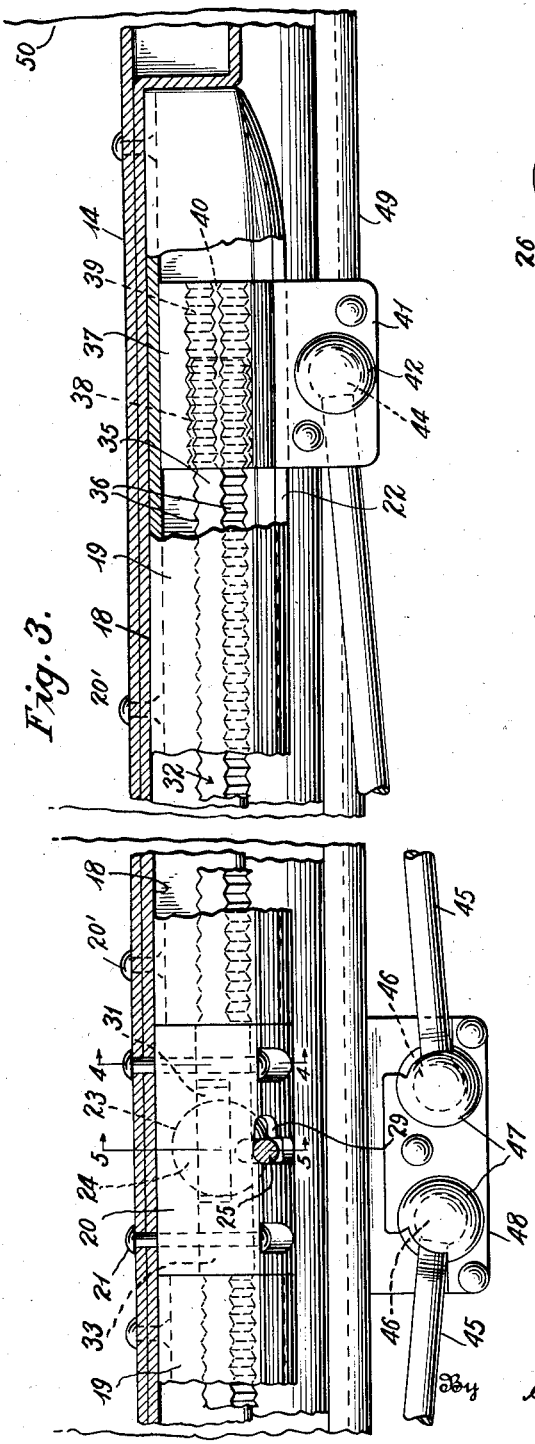
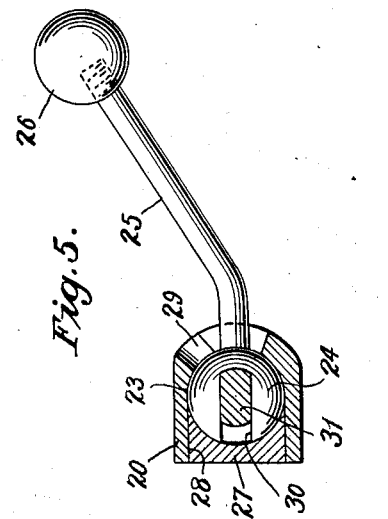
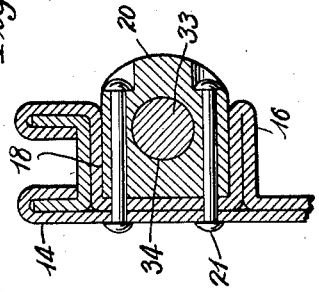
Inventor
L. D. Myers
By Bacon + Thomas
Attorney Patented Sept. 25, 1934

1,974,783

UNITED STATES PATENT OFFICE 1,974,783

AUTOMOBILE WINDSHIELD CONTROL

Leonard D. Myers, Washington, D. C., assignor to Martin-Parry Corporation, York, Pa., a corporation of Delaware Application January 8, 1932, Serial No. 585,598

9 Claims. (Cl. 296—84)

This invention relates to new and useful improvements in automobile windshield controls.

An important object of this invention is to provide a control by means of which a pivotally mounted windshield may be retained in any desired position of adjustment with respect to the windshield frame.

A further important object of the invention is to provide a novel form of retaining means for the windshield.

Other objects and advantages of the invention will be apparent during the course of the following description.

In the accompanying drawings forming a part of this specification and in which like numerals are employed to designate like parts throughout the same, Figure 1 is an elevational view, partly broken away, of a windshield frame and the controlling mechanism embodying this invention operatively associated therewith, Figure 2 is a fragmentary vertical sectional view taken on line 2—2 of Fig. 1, Figure 3 is a fragmentary horizontal sectional veiw taken on line 3—3 of Fig. 1, Figure 4 is a fragmentary vertical sectional view taken on line 4—4 of Fig. 3, Figure 5 is a fragmentary vertical sectional view taken on line 5—5 of Fig. 3, Figure 6 is a detailed elevational view of a portion of the controlling mechanism, Figure 7 is a fragmentary elevational view of a locking rod which forms a part of the control mechanism, and Figure 8 is a vertical sectional view of a slightly modified form of the invention.

In the drawings, wherein for the purpose of illustration is shown a preferred embodiment of this invention, the numeral 10 designates the windshield frame which is formed with an opening 11 to be controlled by the windshield 12. The lower horizontal portion of the frame is formed by a finishing panel or a part of the instrument board, as designated by the reference character 13 in Figs. 1 and 2. In Figs. 2, 3 and 4, the lower horizontal frame member 14 of the windshield is illustrated in section and is formed of sheet metal bent into a pair of horizontally extending flanges 15 and 16 which receive one portion of a rubber packing strip 17. This frame portion 14 is further shaped to provide a horizontal channel 18 adapted to receive a housing 19 which is suitably secured in the channel by rivets or the like 20'. The housing 19 is formed in two sections, and the sections are spaced from each other at their adjacent ends to receive a lever mounting 20 which is secured within the channel 18 by rivets or the like 21. The housing sections 19 have formed in their outer faces the longitudinally extending slots 22. These slots extend from the mounting 20 to points adjacent the outer ends of the housing sections.

This mounting 20 has formed in the center thereof a ball socket 23 adapted to receive the ball 24 formed on the inner end of the actuating lever 25. A ball type of knob 26 is detachably threaded on the free end of this lever 25. A plug 27 closes an opening 28 in the rear wall of the mounting 20 and with this plug 27 removed, the mounting can be moved longitudinally of the actuating lever 25. The mounting is formed with an inverted L-shaped slot 29 through which the lever 25 extends. This slot 29 permits the lever to be moved in two different directions with respect to the mounting 20, or throughout the lengths of the two different branches of the said slot. The ball 24 of the lever 25 is provided with a horizontally extending groove 30 which is adapted to receive the flattened portion 31 of a locking rod 32. This rod is formed with cylindrical journals 33 at opposite ends of the flattened portion 30 and these journals 33 are received within cylindrical bearing portions 34 of the mounting 20, see Fig. 4. The remainder of the locking rod is formed into flattened portions 35 having transversely extending teeth 36 formed on the longitudinal edges. This locking rod 32 extends longitudinally through the mounting 20 and the two sections of the housing 19 to terminate at its opposite ends adjacent the outer ends of the housing sections. Due to the connection between the operating lever 25 and this locking rod, movement of the lever in a vertical plane, or through the vertical branch of the slot 29, will cause the locking rod 32 to rotate about its longitudinal axis.

Each toothed section 35 of the locking rod has associated therewith a block 37 which is formed with a hole 38 extending axially therethrough. This hole has two longitudinal series of teeth 39 formed on diametrically opposite sides of the wall thereof. The teeth 39 are of a proper shape and size to cooperate with the teeth 36 formed on the locking rod 32. Due to the spacing of these two series of teeth 39, each block 37 is formed with two diametrically opposed plane portions 40.

Each block 37 has formed thereon a plate-like extension 41 which projects outwardly of its housing section 19 through the slot 22. The outer portion of this extension has half of a ball socket 42 formed therein. The remainder of the ball socket is formed by a detachable plate 43. A ball 44 formed on the end of a bracing arm 45 is mounted in the socket formed by the portions 41 and 43. By inspecting Figs. 1 and 3, it will be seen that the two bracing arms 45 have balls 46 formed on their inner adjacent ends. These balls are received in sockets 47 formed in a bracket 48 connected to a flanged portion 49 of an automobile cowling 50.

In Fig. 8 there has been disclosed a slight modification of the windshield, the lower frame member 14a. In this modification, the housing sections 19a are not seated in a longitudinally extending channel but are secured to a face 51 of the frame member 14a by means of bolts or the like 52.

This windshield control may be operated in the following manner. Figs. 1 to 3 inclusive disclose the windshield in its closed position. To move the windshield into an open position, the controlling lever 25 must be moved from the position illustrated in Fig. 5 vertically into the position illustrated in Fig. 2, that is with the lever 25 located at the point of connection of the two branches of the slot 29 or at the upper end of the vertical branch of this slot. This movement of the control lever 25 causes the locking rod 32 to be rotated so that the longitudinal series of teeth 36 are positioned as illustrated in Fig. 2 or with the teeth of the locking rod located in the plane portions of the holes formed in the sliding blocks 37.

Due to the disengagement of the teeth on the locking bar from the teeth 39 on the sliding blocks 37, pressure may be applied to the lever 25 for swinging the windshield 12 outwardly upon its hinged mounting. When the windshield has been opened to the desired position, the lever should be moved vertically downwardly into the position shown in Fig. 5 which will cause the locking bar 32 to be rotated to place its teeth 36 in mesh with the teeth 39 formed on the sliding blocks 37. These blocks then will be prevented from moving longitudinally of the housing sections 19 and the windshield will be retained in its opened position by means of the bracing arms 45. When it is desired to close the windshield, or to move the windshield towards its closed position, the control lever 25 again should be moved vertically in the slot 29 to unlock the sliding blocks 37 from the locking bar 32. The lever 25 then should be moved in a direction longitudinally of the locking rod 36 or so that the lever will move into the upper horizontal branch of the slot 29. This will connect the lever to the mounting 20 for permitting the windshield to be pulled toward the operator by means of the lever. After the windshield has been moved to the desired position, the lever should be shifted into its vertical position and then pulled downwardly through the vertical branch of the slot 29 for shifting the locking rod relative to the sliding blocks to cause the teeth on these elements again to interlock. It further will be apparent that after the lever 25 is moved vertically through the slot 29 to unlock the sliding blocks 37 from the locking bar 32, the lever 25 may be moved into the upper horizontal branch of the slot 29 for connecting the lever to the windshield to prevent relative movement therebetween in directions which will actuate the locking bar. The windshield, therefore, either may be opened or closed to any desired extent by means of the lever 25, when arranged in said horizontal branch of the slot, without fear of actuating the locking bar. The horizontal branch of the slot 29, therefore, effects latching of the lever relative to the windshield. It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:

1. In combination, a windshield frame, a windshield pivoted at its upper edge to the frame, an elongated housing attached to the lower edge of the windshield with its longitudinal axis parallel to the pivot axis of the windshield, a block slidable in the housing and held against rotation thereby, a bracing member having universal swivel connections with the block and the lower portion of the frame so that the said member will be permitted to assume different angular positions with respect to the horizontal and the vertical during movements of the windshield, and means received within said housing and rotatable relative to the block for selectively holding and releasing said block to control sliding of the latter in the housing.

2. In combination, a windshield frame, a windshield pivoted at its upper edge to the frame, an elongated housing attached to the lower edge of the windshield with its longitudinal axis parallel to the pivot axis of the windshield, a block slidable in the housing and held against rotation thereby, a bracing member having universal swivel connections with the block and the lower portion of the frame so that the said member will be permitted to assume different angular positions with respect to the horizontal and the vertical during movements of the windshield, and means received within said aperture for selectively holding and releasing said block to control sliding of the latter in the housing, and means mounted to move with the windshield for actuating the holding and releasing means.

3. In combination, a windshield frame, a windshield pivoted at its upper edge to the frame, an elongated housing attached to the lower edge of the windshield with its longitudinal axis parallel to the pivot axis of the windshield, a block slidable in the housing and held against rotation thereby, a bracing member having universal swivel connections with the block and the lower portion of the frame so that the said member will be permitted to assume different angular positions with respect to the horizontal and the vertical during movements of the windshield, said block being formed with an aperture and a plurality of teeth formed in a portion of the wall of said aperture, and means received within said aperture and movable to selectively engage and disengage said teeth to control sliding of the block in said housing.

4. In combination, a windshield frame, a windshield pivoted at its upper edge to the frame, an elongated housing attached to the lower edge of the windshield with its longitudinal axis parallel to the pivot axis of the windshield, a block slidable in the housing and held against rotation thereby, a bracing member having universal swivel connections with the block and the lower portion of the frame so that the said member will be permitted to assume different angular positions with respect to the horizontal and the vertical during movements of the windshield, said block being formed with an aperture and a plurality of teeth formed in a portion of the wall of said aperture, means received within said aperture and movable to selectively engage and disengage said teeth to control sliding of the block in said housing, and means mounted to move with the windshield for actuating said last-mentioned means.

5. In combination, a windshield frame, a windshield pivoted at its upper edge to the frame, an elongated housing attached to the lower edge of the windshield with its longitudinal axis parallel to the pivot axis of the windshield, a block slidable in the housing and held against rotation thereby, a bracing member having universal swivel connections with the block and the lower portion of the frame so that the said member will be permitted to assume different angular positions with respect to the horizontal and the vertical during movements of the windshield, said block being formed with an aperture and a plurality of teeth formed in a portion of the wall of said aperture, and rotatable rod within said housing and said aperture having teeth formed thereon adapted to engage and disengage the teeth in said aperture for controlling sliding of the block in said housing.

6. In combination, a windshield frame, a windshield pivoted at its upper edge to the frame, an elongated housing attached to the lower edge of the windshield with its longitudinal axis parallel to the pivot axis of the windshield, a block slidable in the housing and held against rotation thereby, a bracing member having universal swivel connections with the block and the lower portion of the frame so that the said member will be permitted to assume different angular positions with respect to the horizontal and the vertical during movements of the windshield, said block being formed with an aperture and a plurality of teeth formed in a portion of the wall of said aperture, a rod rotatable within said housing and said aperture having teeth formed thereon adapted to engage and disengage the teeth in said aperture for controlling sliding of the block in said housing, and a control for said rod mounted to move with the windshield.

7. In combination, a windshield frame, a windshield pivoted at its upper edge to the frame, an elongated housing attached to the lower edge of the windshield with its longitudinal axis parallel to the pivot axis of the windshield, a block slidable in the housing and held against rotation thereby, a bracing member having universal swivel connections with the block and the lower portion of the frame so that the said member will be permitted to assume different angular positions with respect to the horizontal and the vertical during movements of the windshield, said block being formed wih an aperture for selectively holding and releasing said block to control sliding of the latter in the housing, and a control lever for said last mentioned means mounted on said windshield to act as a handle for pivoting the windshield.

8. In combination, a winshield frame, a windshield pivoted to the frame, a bracing member pivotally connected to the frame, a housing attached to the windshield, a block slidable in the housing, means attached to the block for pivotal connection with the bracing member, said block being formed with an aperture, means received within said aperture and movable with respect to the block for selectively holding and releasing said block to control sliding of the latter in said housing, a control for said last mentioned means mounted on the windshield for movement into two different positions to effect actuation of said last mentioned means to cause said block to be held or released, means to connect said control to the windshield, when the control is in the position to cause releasing of the block to permit opening of the windshield by pushing upon the control, said control being movable into a third position with the block still released, and means for connecting the control to the windshield, when the control is in said third position to permit closing of the windshield by pulling upon the control.

9. In combination, a pivoted windshield, mechanism associated with the windshield and its support for holding the windshield in any desired position of adjustment thereof, a control lever mounted on the windshield for movement relative thereto to actuate said mechanism, latching means for the control lever carried by the windshield out of the normal mechanism actuating path of movement of said lever, and a connection between the control lever and the mechanism which permits the control to be moved into holding relation with respect to said latching means to enable the control lever to be employed to adjust the windshield without actuating said mechanism.

LEONARD D. MYERS.